United States Patent Office 2,953,596
Patented Sept. 20, 1960

2,953,596

PREPARATION OF SECONDARY PHOSPHINE OXIDES

Michael M. Rauhut, Stamford, Conn., Ingenuin Hechenbleikner, Clarksburg, Mass., and Helen A. Currier, Greenwich, Conn., assignors to American Cyanamid Company, New York, N.Y., a corporation of Maine No Drawing. Filed July 31, 1958, Ser. No. 752,167

6 Claims. (Cl. 260—465.8)

The present invention relates to the preparation of organophosphorus compounds. More particularly, the invention provides a simple and economical process for the production of secondary phosphine oxides.

Heretofore, secondary alkylphosphine oxides have been prepared by a Grignard reaction. The preparation of the di-n-hexyl-, di-n-otcyl- and di-n-octadecylphosphine oxides, i.e., compounds of the type

by the reaction of the appropriate Grignard reagent with di-n-butyl phosphite is reported by Williams and Hamilton, J. Am. Chem. Soc., 74, 5418 (1952). The di-n-octylphosphine oxide was also prepared by the reaction of di-n-octylphosphinyl chloride with lithium aluminum hydride.

In accordance with the present invention, it has been found that secondary aliphatic phosphine oxides can be readily obtained by reacting the corresponding secondary phosphines with air. The present process thus comprises bringing a secondary aliphatic phosphine into contact with air and recovering the thus-formed secondary phospine oxide from the reaction product.

The reaction process is general in nature and a wide variety of secondary aliphatic hydrocarbon phosphines, either substituted or unsubstituted, may be employed. These secondary phosphines may be illustrated by the formula

wherein R and R' represent the saturated and unsaturated, and the branch and straight chain aliphatic hydrocarbon radicals, and also hydrocarbon radicals carrying non-oxidizing substituents such as a halogen, cyano, amino, hydroxyl, carbamyl, acyloxy, carbalkoxy, carboxy, alkyloxy, aryl, aryloxy and the like. R and R' may be the same or different radicals.

It is therefore to be understood that the term "secondary aliphatic phosphine" as used in this specification and the appended claims is intended to denote a phosphine of the type illustrated by the above formula

by the same token and as suggested hereinabove, the secondary phosphine oxides recovered correspond to the formula

in which R and R' are the same as their corresponding moieties in the reactant formula.

In general, the reaction of the secondary aliphatic phosphines with air takes place at temperatures ranging from 0° to about 100° C., and preferably from about 20° to 60° C.

While the reaction may be conducted by simply exposing the secondary phosphine to an atmosphere of dry air, it may also be carried out in an inert liquid diluent or solvent such as the aliphatic alcohols, ketones such as acetone, methyl ethyl ketone and methyl isobutyl ketone, aliphatic esters such as ethyl acetate, amyl acetate and methyl butyrate, 1,2-dimethoxyethane, acetonitrile, dioxane and the like.

The invention will be further illustrated in conjunction with the following examples which are to be taken as illustrative only and not by way of limitation.

Example 1

One gram of bis(2-cyanoethyl)phosphine was spread in a thin layer on a glass plate, and then exposed to air for two hours at a temperature of about 25° C. The resulting crystalline solid was recrystallized from acetone to give the bis(2-cyanoethyl)phosphine oxide, M.P. 96–98° C.

Example 2

A mixture of 200 g. of bis(2-cyanoethyl)phosphine in 500 ml. of isopropyl alcohol was warmed to about 60° C. on a steam bath. Dry air was passed through the solution for a period of 5 hours. The reaction mixture was cooled to room temperature, and the precipitated product was collected by filtration. Recrystallization from isopropyl alcohol gave 200 g. (90% of theory) of the bis-(2-cyanoethyl)phosphine oxide, M.P. 98–99° C.

Example 3

Dry air was bubbled through a solution of 16 g. of di-n-butylphosphine in 50 ml. of isopropyl alcohol for 90 minutes at room temperature. The solvent was then evaporated under vacuum, and the residual solid was recrystallized from petroleum ether to give the di-n-butylphosphine oxide, M.P. 58–60° C.

Example 4

Ten grams of di-n-octylphosphine was dissolved in 20 ml. of isopropyl alcohol. Air was passed through the solution for a period of 30 minutes. The solution became warm and most of the alcohol evaporated. The residual solid was recrystallized from hexane to give 6.5 g. of di-n-octylphosphine oxide, M.P. 86° C.

Example 5

Dry air was passed through a solution of 10 g. of didodecylphosphine in 25 ml. of isopropyl alcohol during a period of four hours. The temperature was maintained at 60–62° C. by means of an oil bath. The product crystallized when the solution was cooled, and was then washed onto a filter with 50 ml. of petroleum ether. The yield of didodecylphosphine oxide, M.P. 98–100° C., was 7.4 g. (71% of theory).

Example 6

Sixteen grams of octyl-2-carbethoxyethylphosphine was spread in a thin layer on a glass plate, and then exposed to the air for one hour at room temperature. The resulting crystalline solid was recrystallized from petroleum ether to give the octyl-2-carbethoxyethylphosphine oxide, M.P. 50–52° C.

Example 7

Bis(2-phenylethyl)phosphine (4.3 g.) was spread in a thin layer and exposed to the air for one hour. The resulting crystalline solid (4.0 g., 87% of theory) was recrystallized from heptane to give pure bis(2-phenylethyl)-phosphine oxide, M.P. 69–71° C.

*Example 8*

Two grams of octyl-2-cyanoethylphosphine was spread in a thin layer on a glass surface, and then exposed to the air for a period of 4 hours. The resulting crystalline solid was recrystallized from a mixture of equal parts of benzene and petroleum ether to give the octyl-2-cyanoethylphosphine oxide, M.P. 68–69° C.

The secondary phosphine oxides prepared in accordance with the present invention have been found useful in a number of fields. For instance, the compounds prepared in Examples 2 and 8 above are plasticizers for polyacrylonitrile, and the secondary alkylphosphine oxides containing more than three carbon atoms in each alkyl radical, such as those prepared in Examples 3, 4 and 5 above, are useful as antiknock agents in gasolines and as antifriction additives to lubricating oils.

We claim:

1. A process which comprises reacting a secondary phosphine corresponding to the formula

wherein R and R' represent a member selected from the group consisting of substituted and unsubstituted, branched and straight chain alkyl radicals containing 1 to 12 carbon atoms, said substituents being non-oxidizing substituents under the conditions of the reaction, with air at a temperature within the range of 0° C. to 100° C. until a substantial proportion of the secondary aliphatic phosphine reactant is converted to the corresponding secondary aliphatic phosphine oxide represented by the formula

in which R and R' correspond to R and R' in the reactant formula above.

2. A process according to claim 1 in which the reaction is carried out in the presence of an inert liquid solvent.

3. A process according to claim 1 in which the secondary aliphatic phosphine is a dialkyl phosphine containing more than three carbon atoms in each alkyl radical.

4. A process according to claim 1 in which the secondary aliphatic phosphine is bis(2-cyanoethyl) phosphine.

5. A process according to claim 1 in which the secondary aliphatic phosphine is octyl-2-carbethoxyethylphosphine.

6. A process according to claim 1 in which the secondary aliphatic phosphine is di-n-butylphosphine.

References Cited in the file of this patent

Kosolapoff: "Organophosphorus Compounds," 1950, page 23.

Williams et al.: J.A.C.S., vol. 74, Nov. 5, 1952, pages 5418–5420.

Rauhut et al.: J.A.C.S., 80, pages 6690–6691 (1958).